United States Patent [19]

Hedin et al.

[11] 4,360,926

[45] Nov. 23, 1982

[54] DIGITAL PHASE-LOCKED LOOP

[75] Inventors: Jan S. Hedin, Tumba; Göran A. Jarnestedt, Johanneshov, both of Sweden

[73] Assignee: Telefonaktiebolaget L M Ericsson, Stockholm, Sweden

[21] Appl. No.: 196,053

[22] PCT Filed: Oct. 12, 1979

[86] PCT No.: PCT/SE79/00205
  § 371 Date: Jun. 13, 1980
  § 102(e) Date: May 30, 1980

[87] PCT Pub. No.: WO80/00904
  PCT Pub. Date: May 1, 1980

[30] Foreign Application Priority Data
  Oct. 13, 1978 [SE] Sweden ............... 7810736

[51] Int. Cl.³ .................................. H04L 7/08
[52] U.S. Cl. ................ 375/120; 375/94; 331/1 A; 329/122
[58] Field of Search ............... 375/108–120, 375/81, 94; 331/1 A; 360/34; 328/53, 63, 72; 329/50, 122

[56] References Cited

U.S. PATENT DOCUMENTS 4,030,045  6/1977  Clark .................... 331/1 A
4,085,288  4/1978  Viswanathan ............ 331/1 A
4,151,485  4/1979  La Fratta .............. 331/1 A Primary Examiner—Benedict V. Safourek
Assistant Examiner—Stephen Chin
Attorney, Agent, or Firm—Hane, Roberts, Spiecens & Cohen

[57] ABSTRACT

In a digital phase-locked loop, preferably for bit rate regeneration in synchronous data transmission systems, transmitting from a sender to a receiver redundantly coded information possibly modulated in a suitable mode there is an addition circuit connected to one control input of a digital controlled oscillator incorporated in the loop. The addition circuit adds control signal contributions from a phase comparator circuit of the loop and an error detector. This error detector is connected to an output of the receiver data detector, and examines whether the input signal in the circuit has the inherent redundant properties expected taking into account the signal coding. When this is not the case, a pulse-shaped control signal is fed to the addition circuit.

1 Claim, 1 Drawing Figure

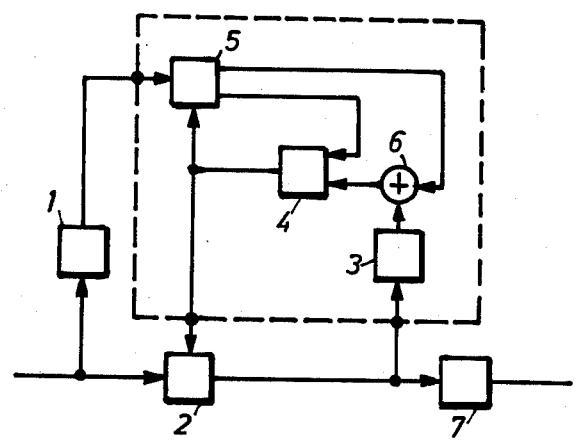

DIGITAL PHASE-LOCKED LOOP

FIELD OF THE INVENTION

The present invention relates to a digital phase-locked loop, preferably for bit rate regeneration in synchronous data transmission systems, which transfer from a transmitter to a receiver redundantly coded information, modulated in a suitable mode.

DESCRIPTION OF PRIOR ART

In order that a data signal can be regenerated correctly at the receiver side in a synchronous data transmission system, the information about, inter alia, bit rate and bit phase must be available in the receiver. It is previously known to utilize a phase-locked loop controlled by, for example, zero level crossings, in the transmitted base band signal for regeneration of the bit rate.

BACKGROUND OF THE INVENTION

In data transmission systems of the kind mentioned above, there is sometimes the risk that the bit rate regenerator locks in an incorrect phase position even if the frequency is correct per se. This means that the data detector of the system does not sample in the centre of the eye of the eye pattern of the transmitted signal, and the resulting bit error frequency will thus be high. As the phase-locked loop only sporadically receives relevant control information to get itself out of this state, correct synchronization can require a relatively long time. This is naturally a clear disadvantage for all systems of this kind and is especially troublesome in a system for two-way communication on the same channel, for example, i.e. alternating transmission and reception from each terminal. For such systems the synchronization sequence will of course be especially frequent.

SUMMARY OF THE INVENTION

The phase-locked loop in accordance with the present invention, the distinguishing features of which are apparent from the accompanying claims, solves the above technical problem, providing that the transmitted signal is redundantly coded in some respect. Above all, the solution gives the advantage that the synchronization time, e.g. when starting up, is greatly reduced by preventing locking in an incorrect phase-position.

BRIEF DESCRIPTION OF THE DRAWING

The invention will now be described while referring to the accompanying drawing, whose sole FIGURE illustrates an embodiment of the phase-locked loop in accordance with the invention.

PREFERRED EMBODIMENTS

In the following description, it is assumed that the receiver can discover errors in the transmitted data flow. There is this possibility, e.g. when data is transferred with a parity bit or with redundant data coding. Such coding signifies that the transmitted signal elements are correlated, e.g. as with base band coding according to the Partial-Response concept, bi-phase coding, AMI-coding (Alternate Mark Inversion), Miller coding etc.

The correlation between the signal elements in these codes is primarily introduced to obtain a suitable spectral distribution for the transmission, but can thus also be used for enabling error detection on the receiver side.

If AMI-coding is taken as an example, then the binary information "1" is transmitted with pulses which alternate in polarity, and the binary information "0" with an excluded pulse, i.e. zero level. With a simple check that the pulses alternate in polarity in the received base band signal in the detector, detection errors, or bipolar violations (BPV) can be discovered.

When the regenerated bit rate is synchronized to the right phase position for controlling the time when the data detector senses and detects the base band signal, BPV only occurs because of disturbances in the data transmission itself. On the other hand, if the regenerated bit rate is out of phase e.g. during the synchronization sequence, or during incorrect locking of its phase position, the number of BPV's increases very greatly.

The FIGURE illustrates a part of the receiver in a transmission system in accordance with the above. The transmitted data signal, demodulated where applicable, arrives at the data detector 2 of the receiver, where it is sampled. In a following operation it is decoded in the decoder 7. A bit rate extraction circuit 1 connected to the detector input scans the base band signal with respect to some periodically appearing characteristic, e.g. the passage of the signal through certain predetermined levels or a fixed level, e.g. the zero level (zero crossing detector). Each time the signal passes through such a level, or complies with some other predetermined criterion, a pulse-shaped signal appears on its output. The output of the bit rate extraction circuit 1 is connected to one of the inputs on a phase comparator circuit 5 having two inputs and two outputs. The outputs of the latter are connected to the control inputs on a digital controlled oscillator 4, the output of which is connected to the remaining input on the comparator circuit. The phase comparator 5 compares the phase positions of the first and second input signals in relation to each other. When the first input signal phase leads, an output signal appears on one of the outputs, and for the opposite relationship, an output signal appears on the other output. The control inputs of the oscillator receive these signals and the signals control the frequency of the oscillator to increase or decrease, respectively, in response to which control signal is applied for the moment, and in such a way that the phase difference between the input signals to the comparator circuit 5 decrease.

The output of the oscillator 4 is further connected to the sampling signal input of the detector 2, which means that the scanning frequency and phase of the detector is determined by the corresponding instantaneous output variables of the oscillator 4.

However, according to what has been said above, the loop can lock in an incorrect phase position even if the recovered frequency is correct per se. The consequence is, as mentioned, that the bit error frequency in the output signal from the detector will be high.

An error detector 3 is connected to the data detector output. In accordance with the preferred embodiment, error detector 3 examines the detector output signal to find out whether the, taking into account the signal coding, the expected, inherent redundant properties are present. When this is not the case, a signal is fed from the output of the error detector to one of the inputs of an addition circuit 6 connected thereto. This addition circuit is connected in the signal path for either output signal from said phase comparator circuit in such a way that its output is connected to one control input on the oscillator 4 and its other input is connected to an output on the comparator circuit.

In the typical case where the phase-locked loop has been locked in an incorrect phase position, and relevant control information to the oscillator 4 for taking the loop out of this state appears relatively infrequenctly, the above arrangement obviously gives the possibility, in response to the connection of the addition circuit, to control the oscillator by means of a decrease or increase of the frequency to the correct phase position. Since the bit error frequency is high, at least in the initial stages of this correction, the pulse frequency will be high on the output of the error detector 3, and consequenctly the synchronization sequence will be fast.

The apparatus naturally functions according to the above even in the case where the loop has not been locked in an incorrect phase position, but is in a heavily phase-shifted initial position at the start of the data transmission.

The error detector is thus connected into the system are the time, but is mainly inactive during the whole of the normal steady state of the system. Only the errors introduced in the actual transmission between transmitter and receiver are registered, and give rise to control pulses to the oscillator. Such control pulses are compensated without difficulty, in the normal control cycle in the loop, however.

What we claim is:

1. In a data transmission system for transmitting redundantly coded digital information, a digital phase-locked loop apparatus comprising: a data detector means for detecting redundantly coded information received at a data input in response to sampling pulses received at a sampling input; a digitally controlled oscillator means having an output connected to said sampling input for generating sampling pulses and having first and second inputs for changing the frequency of the sampling pulses in opposite directions in accordance with which of said inputs receives a pulse signal; a digital phase comparator means having first and second inputs for receiving, respectively, pulse signals related to the received redundantly coded digital information and the sampling pulses from the output of said digitally controlled oscillator means, and first and second outputs for transmitting pulse signals from either one of said outputs in accordance with which of the two signals received at said inputs leads in phase, said first output being connected to the first input of said digitally controlled oscillator means; an error detector means connected to said data detector means and having an output for emitting a pulse signal whenever the inherent redundant properties of the digital information are absent; and pulse signal adder means having a first input connected to the output of said error detector means, a second input connected to the second output of said digital phase comparator means, and an output connected to the second input of said digitally controlled oscillator means.

* * * * *